May 16, 1933.  A. W. SIZER  1,909,228

MOLDING MACHINE

Filed Feb. 13, 1932  2 Sheets-Sheet 1

INVENTOR
Albert W. Sizer,
BY
ATTORNEYS

May 16, 1933.  A. W. SIZER  1,909,228
MOLDING MACHINE
Filed Feb. 13, 1932   2 Sheets-Sheet 2

INVENTOR
Albert W. Sizer,
BY
ATTORNEYS.

Patented May 16, 1933

1,909,228

UNITED STATES PATENT OFFICE

ALBERT WILLIAM SIZER, OF KINGSTON-UPON-HULL, ENGLAND

MOLDING MACHINE

Application filed February 13, 1932. Serial No. 592,739.

The present invention relates to improvements in molding machines of the type in which meal or the like material is fed to the space between a pair of co-operating rolls, one or both of which has radial perforations.

It has been usual to provide interengaging axial rib and groove surfaces on the rolls, the perforations being either at the root of the grooves or at the apex of the ribs.

Now, in the manufacture of pellets of small diameter, the co-operating teeth being commensurate with the size of the perforation to avoid any dead spaces in which meal can permanently lodge, become very small with the risk of stripping of the ribs.

According to the present invention, two or more perforations are provided as a group either in the base of the grooves or alternatively, at the apices of the ribs.

A machine of this type is particularly suitable for the manufacture of pellets for the feeding of young chicks and the like infantile animals.

The invention is more particularly described with reference to the accompanying drawings in which:—

Figure 1:
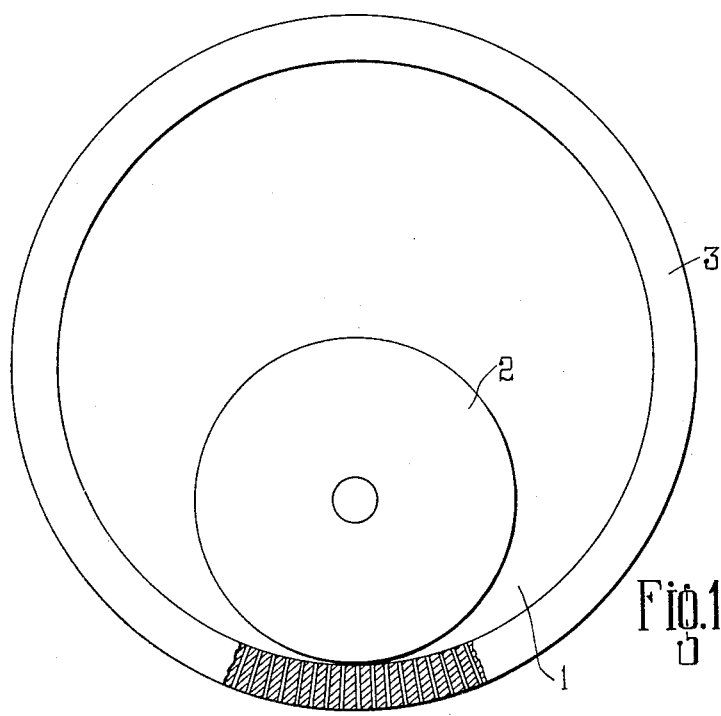
Figures 1 and 2 are diagrammatic views.
Figure 4:
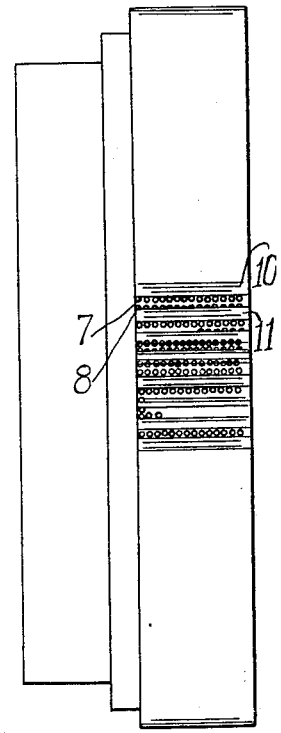
Figure 4 is a part outside view of one of the rolls.
Figure 2:
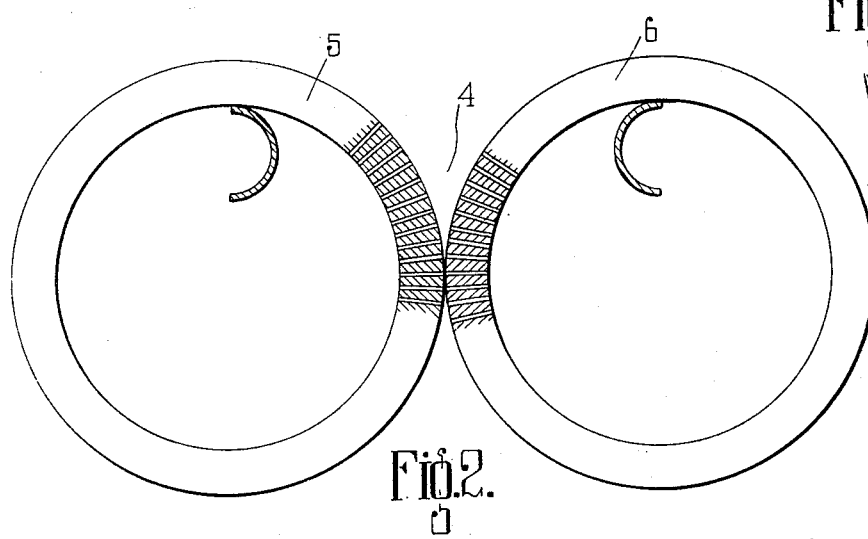
Figure 5:
Figure 5 is a detail view of the spaced grooves and interposed ribs of a roll on an enlarged scale.
Figure 3:
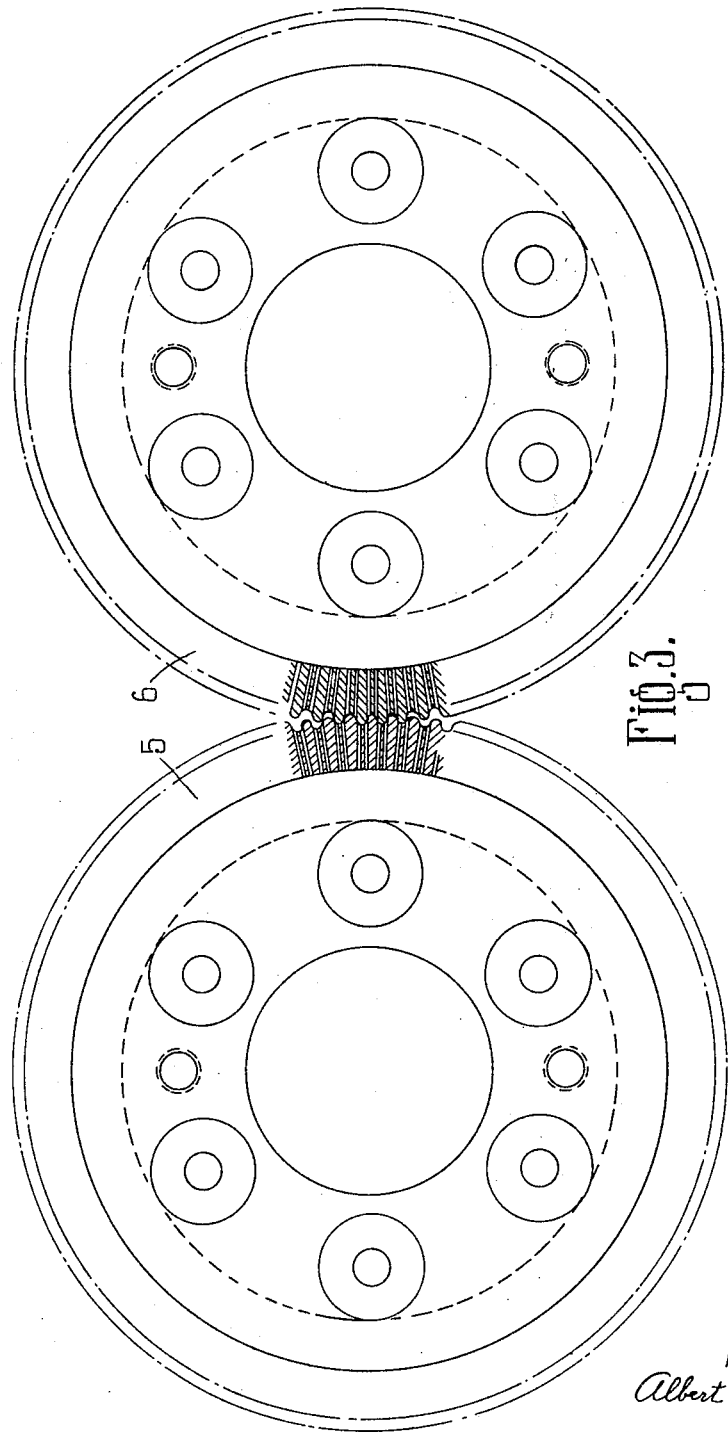
Figure 3 is a part sectional end view of a pair of co-operating rolls according to the present invention.

The improvements of the present invention are applicable to molding machines of either the type of Figure 1, in which meal is fed to the space 1 between the external surface of a roll 2 and the internal surface of a radially ported ring 3, or again to the type of machine as shown in Figure 2, in which meal is fed to the space 4 between the external surface of a pair of rolls 5, 6, one or both of which has radial perforations, and which are provided with intermeshing axial grooves and ribs on their peripheries.

According to the present invention two or more perforations 7, 8, usually of a diameter not exceeding three-thirty seconds of an inch are formed as a group in the root of the groove 9 between successive ribs 10, 11, formed on the outer surface of one or both rolls, such as 5, 6, taken by way of example. By this means, a large diameter of groove and a large diameter of the rib 11 is possible, whilst yet maintaining a small size of perforation, thus allowing for the molding of extremely small pellets whilst maintaining the strength of construction of the roll, whereby stripping of the ribs is avoided.

I declare that what I claim is:—

1. A molding machine comprising in combination, a pair of cooperating rolls, at least one of the rolls being hollow and having perforations arranged in peripherally spaced groups, each group including a plurality of peripherally spaced radial perforations extending through the radial thickness of the roll wall, and intermeshing axial ribs on said rolls spaced peripherally apart to leave a number of perforations peripherally of the roll in each groove presented between suceeding ribs, means for feeding meal to the space between the rolls, and means for stripping the extruded cords of compressed meal in the form of pellets.

2. A molding machine comprising in combination, a pair of hollow rolls contacting on their outer peripheries and having perforations arranged in peripherally spaced groups, each group including a plurality of peripherally spaced radial perforations extending through the radial thickness of the rolls, and intermeshing axial ribs on said rolls spaced peripherally apart to leave a number of peripherally spaced perforations in each groove presented between succeeding ribs, means for feeding meal to the space between the rolls, and means for stripping the extruded cords of compressed meal on the interior surface of each roll to form pellets.

3. A molding machine comprising in combination, a pair of cooperating rolls each having spaced ribs and grooves extending in an axial direction across the surface thereof, the ribs of each roll being adapted to register with the grooves in the cooperating roll, at least one of said rolls being hollow and having groups of perforations with the groups spaced at peripheral distances equal to the spacing of said ribs, each of said groups including a plurality of peripherally spaced rows of substantially radial perforations extending through the radial thickness of the roll wall, means for feeding meal to the space between said rolls, and means for stripping the extruded cords of compressed meal in the form of pellets.

In witness whereof, I have hereunto signed my name this 21st day of January 1932.

ALBERT WILLIAM SIZER.